(No Model.) 3 Sheets—Sheet 1.

J. HAISH.
VEHICLE HUB.

No. 398,148. Patented Feb. 19, 1889.

Witnesses:
Frank B. Blanchard
Edwin L. Jewell

Inventor:
Jacob Haish
By John G. Manahan
Attorney (No Model.) 3 Sheets—Sheet 2.

J. HAISH.
VEHICLE HUB.

No. 398,148. Patented Feb. 19, 1889.

Witnesses:
Frank Blanchard
Edwin L. Yewell

Inventor:
Jacob Haish,
By John G. Manahan
Atty.

(No Model.) 3 Sheets—Sheet 3.

J. HAISH.
VEHICLE HUB.

No. 398,148. Patented Feb. 19, 1889.

Witnesses:
Frank S. Blanchard
Edwin L. Jewell

Inventor:
Jacob Haish
By John G. Manahan,
Attorney.

UNITED STATES PATENT OFFICE.

JACOB HAISH, OF DE KALB, ILLINOIS.

VEHICLE-HUB.

SPECIFICATION forming part of Letters Patent No. 398,148, dated February 19, 1889.

Application filed September 27, 1888. Serial No. 286,612. (No model.)

*To all whom it may concern:*

Be it known that I, JACOB HAISH, a citizen of the United States, residing at De Kalb, in the county of De Kalb and State of Illinois, have invented certain new and useful Improvements in Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to improvements in vehicles, and pertains more especially to the construction of the hub of the wheel, mode of seating the spokes therein, and the conformation of the spindle or end of the axle.

The objects of my invention are, first, provision for seating the spokes in a dovetailed form in the hub, and to drive said spokes into position sidewise, as distinguished from the usual end driving, whereby it is practicable to give the inner end of the spokes a dovetailed formation to certainly secure them against casual withdrawal; second, to reduce the bearing-area between the axle-spindle and the hub, to place such bearing-points at the extremities of the hub, and provide a means of automatically oiling such bearing-surface from a central oil-receptacle; third, to provide such central oil-chamber; fourth, to give the periphery of the spindle such a conformation as that the rotation of the wheel will tend to force out at the end of the hub any dirt or foreign substance that may casually find access thereto, and, fifth, to substantially seal the end of the hub against any casual escape of the lubricating-oil within it.

Figure 1:
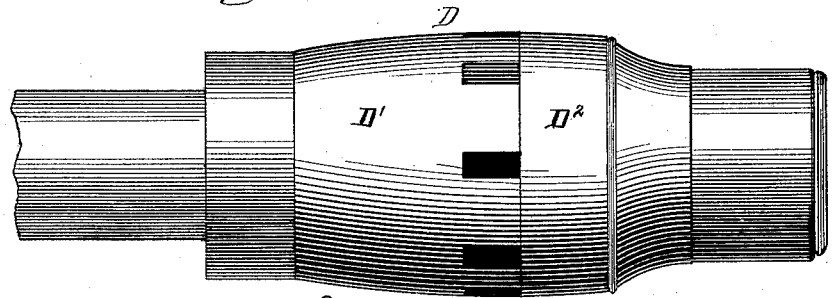
Figure 2:
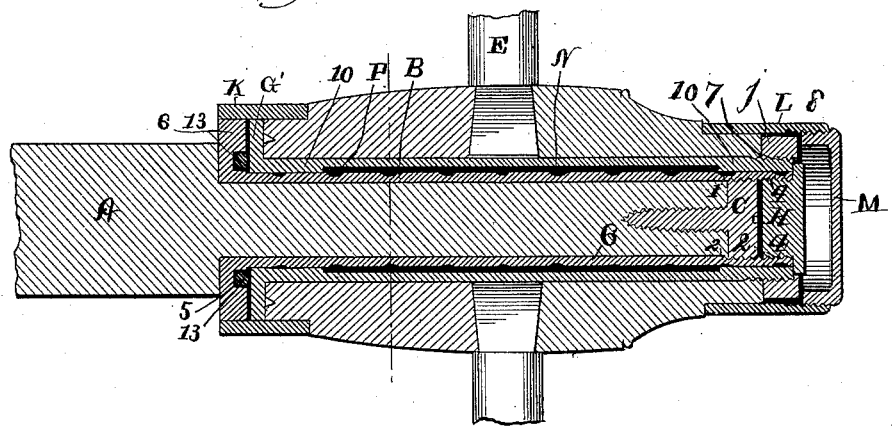
Figure 3:
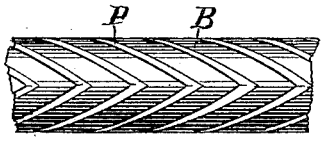
Figure 4:
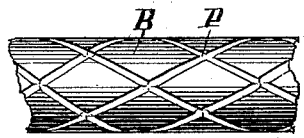
Figure 5:
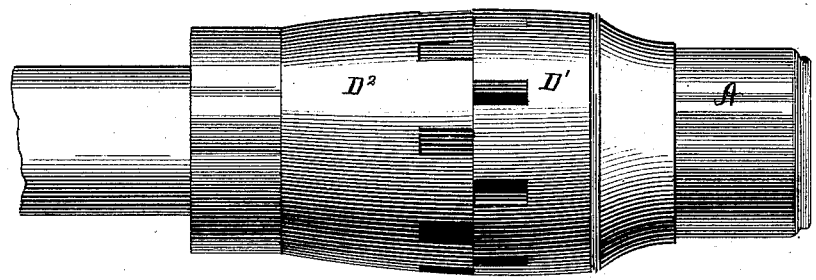
Figure 6:
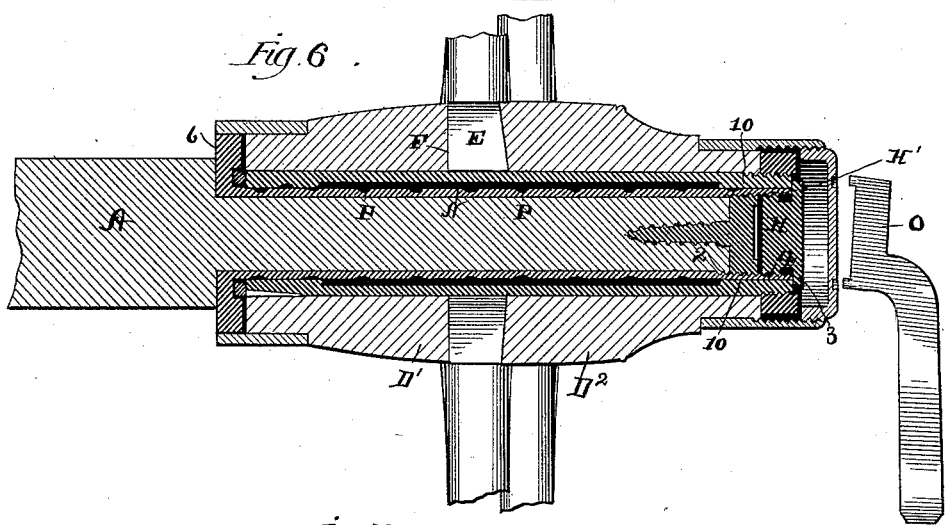
Figure 7:
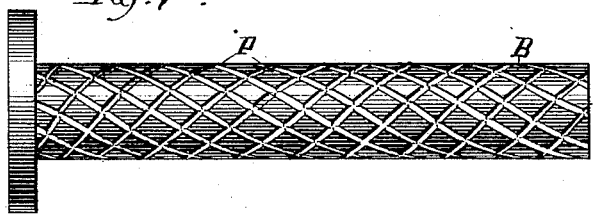
Figure 8:
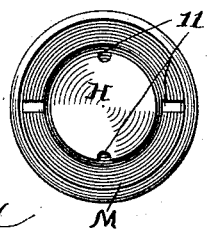
Figure 9:
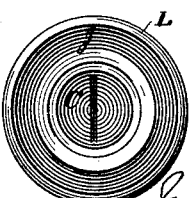
Figure 10:
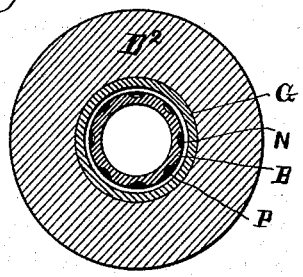
Figure 11:
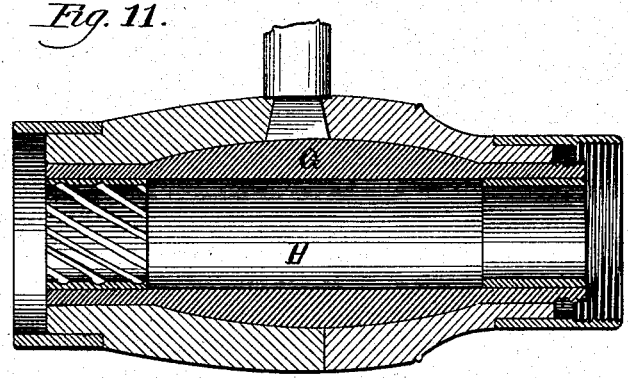
Figure 12:
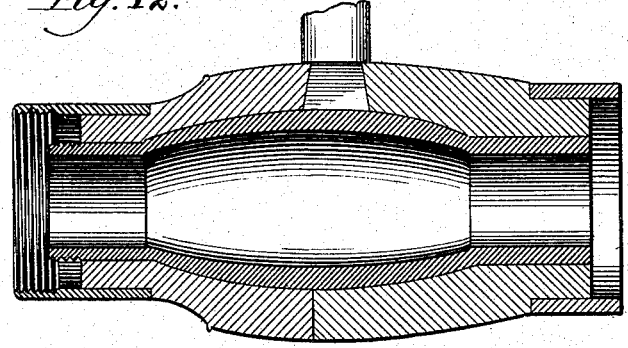

In the drawings, Figure 1 is a perspective of a hub containing my invention in position upon the axle. Fig. 2 is a longitudinal central section of the same. Figs. 3 and 4 exhibit in section two modified forms of diagonal grooves in the periphery of the spindle. Fig. 5 is the same as Fig. 1, except that the hub in Fig. 5 is shown adapted to receive a double series of spokes. Fig. 6 is a longitudinal central section of the construction shown in Fig. 5, and also exhibits the form of wrench used to place or remove the end caps. Fig. 7 is a perspective of the axle-spindle with the series of spiral grooves formed in its periphery. The form of grooves shown in Fig. 7 is that which I have adopted, although the modified configuration shown in Figs. 3 and 4 will operate nearly or quite as well. Fig. 8 is a view of the outer end of the hub when closed and in position on the axle, with the center of cap M removed, showing cap H. Fig. 9 is a view of the same with the end caps, M and H, removed. Fig. 10 is a cross-section in the line $x$ $x$ of Fig. 2. Fig. 11 is a modified form of the construction shown in Fig. 2, with the interior of the hub centrally enlarged and a portion of the shell of the spindle cut away, exhibiting diagonal ribs formed on a portion of the interior of said shell to assist in holding the same on the end of the wooden axle. Fig. 12 is a longitudinal central section of the hub, showing the central oil-recess in a concave form.

Referring to Fig. 2, where the parts are shown in their mutual relation, A is the end of the wooden axle inserted in the metallic skein or pipe B, and held in place therein by the end screw, C, which latter is seated by being screwed into the end of the axle A, and by having screw-threads 1 formed on the periphery of its head conformable to like threads 2, formed on the interior wall of the skein B.

D is the hub, which is cut in two transversely near its center, thus forming the inner end, D', and the outer end, D².

E is the inner end of the spokes, having a dovetailed conformation adapted to enter and fill the dovetailed recess, F, formed in the hub D.

G is the pipe-box lining the interior of the hub D, and is provided at its inner end with the external annular flange, G', Fig. 2, to form a shoulder for the inner end of said hub.

The interior cap, H, provided laterally with the annular head or flange 3 at its outer end, is also provided with thread 4, formed on the periphery of its interior portion or stem, and is thus adapted to be screwed into thread 2 on the interior of the outer end of the skein B, which latter extends somewhat beyond the axle A, and as the flange 3 extends slightly over the outer end of the pipe B, the cap H serves the double function of holding the hub D on the skein B, and also seals the interval between said skein and pipe-box G, against the escape of the lubricating-oil. An annular recess, 5, adapted to receive a rubber ring, 13, is formed in the outer face of the annular flange 6 on the inner end of the skein B, adjacent to the flange G' of the box G, and serves to prevent the escape of the lubricating-oil at the inner end of said hub.

On the exterior of the outer end of the pipe-box G is formed a screw-thread, 7, and a ring, J, having conformable threads in its interior wall, is screwed upon the thread 7, and serves to hold the two halves of the hub D together.

K is the inner hub-band, and L the outer one. In the inner wall of the outer hub-band, L, there are formed screw-threads 8 and cap M, having like screw-threads 9 formed on its periphery, is thereby screwed into the end of the outer band, L, and effectually seals the end of the hub against the admission of any dirt thereto.

Recesses 11, Fig. 8, are formed in the outer surface of the interior cap, H, and exterior cap, M, and by means of a wrench, O, of the conformation shown in Fig. 6, said caps can be seated or removed.

The ends 10 of the walls of the pipe-box G, Fig. 2, are thicker than its central portion, resulting in the formation of the elongated oil-recess N. The oil is placed in said recess either before the wheel is put on the axle or it can be admitted thereto by means of the usual opening through the hub D, or in any other obvious mode.

By reason of the form of central recess, N, the ends 10 are the only portion of the box G, which supports the axle A, thus reducing the amount of the usual friction.

When the vehicle is stationary, the oil will collect by its own gravity in the bottom of the oil-recess N.

Each series of spiral grooves P on the exterior of the skein or spindle B is formed reversely of the other, Fig. 7, and in the rotation of the hub D serve to force or carry the oil from said oil-recess to and from each end of the hub D and to and from the bearing portions aforesaid. The oil passes outward in one series of said grooves and the excess inward in the other series. Thus a constant circulation of oil is maintained over the bearing-surfaces of said spindle. Thus oil sufficient for a long period of usage can be primarily stored in the oil-recess N.

The advantage of making the hub D of the two parts D' and D² consists in the fact that thereby the inner ends of the spokes E may have the dovetailed formation to fit the dovetailed recess F in said hub, and said spokes can be forced sidewise into said recess before the two parts D' and D² are brought together. In the construction of the wheel the outer ends of the spokes may be first seated in the felly and the inner ends of said spokes subsequently forced laterally into position in the hub D, as aforesaid, and after the ring J is driven to its seat it is impossible for the spokes E to be drawn from the recess F.

The spokes E may all be seated in the part D', as shown in Fig. 1, or may alternate in the parts D' and D², as shown in Fig. 5. The inner ends of the spokes E may be readily formed by machinery.

The form of hub shown might be adapted with obvious changes to be used upon an iron axle.

The thicker ends 10 of the box G may, if preferred, consist of interior bands driven into the ends of said box.

By forming the hub D of two parts, as shown, it is feasible to use a box, G, having a swelled or enlarged center, as shown in Fig. 12, in which event the oil-recess N will be concave in form.

What I claim as my invention, and desire to secure by Letters Patent of the United States, is—

1. The combination of the parts D' and D², one or both of said parts being provided with dovetailed recesses F, spokes E, provided with conformable dovetailed inner ends, adapted to be moved laterally into said recesses F, pipe-box G, provided with external annular flange G' with exterior thread, 7, and with thickened ends 10, ring J, provided with interior threads, 12, and the skein B, provided with peripheral spiral grooves P, substantially as shown, and for the purpose described.

2. The combination of the skein B, provided with the interior end threads, 2, and with the flange 6 and annular recess 5 therein, the rubber ring 13, the cap H, provided with flange 3 and threads 4, and hub D, provided with the pipe-box G, substantially as shown, and for the purpose described.

3. The combination of the skein B, provided peripherally with the spiral grooves P, and the pipe-box G, provided with thickened ends 10 and central oil-recess, N, whereby the bearing-surface of the axle is reduced and the rotation of said hub tends to carry the oil under the bearing portions of said axle, substantially as shown, and for the purpose described.

In testimony whereof I affix my signature in presence of two witnesses.

JACOB HAISH.

Witnesses:
CHARLES A. SALISBURY,
SAML. P. BRADSHAW.